United States Patent [19]
Kim

[11] Patent Number: 5,933,530
[45] Date of Patent: Aug. 3, 1999

[54] IMAGE RECOGNITION APPARATUS USING IMAGE ENHANCEMENT PROCESSING

[75] Inventor: Gyu-Hag Kim, Inchon, Rep. of Korea

[73] Assignee: LG Industrial Systems Co., Ltd., Seoul, Rep. of Korea

[21] Appl. No.: 08/846,492

[22] Filed: Apr. 28, 1997

[30] Foreign Application Priority Data

Apr. 27, 1996 [KR] Rep. of Korea .................. 96/13305

[51] Int. Cl.$^6$ ............... G06K 9/68; G06K 9/76; G06K 9/40; G06K 9/64
[52] U.S. Cl. .................. 382/218; 382/211; 382/260; 382/278; 382/279
[58] Field of Search .................. 382/209, 211, 382/212, 213, 217, 218, 220, 221, 222, 258, 260, 261, 262, 278, 279

[56] References Cited

U.S. PATENT DOCUMENTS

| | | | |
|---|---|---|---|
| 4,685,143 | 8/1987 | Choate | 382/199 |
| 4,829,380 | 5/1989 | Iadipaolo | 358/166 |
| 4,972,359 | 11/1990 | Silver et al. | 382/279 |
| 5,197,140 | 3/1993 | Balmer | 395/400 |
| 5,485,611 | 1/1996 | Astle | 382/236 |
| 5,640,200 | 6/1997 | Mitchael | 382/151 |
| 5,717,785 | 2/1998 | Silver | 382/151 |
| 5,757,287 | 5/1998 | Kitamura et al. | 382/104 |

*Primary Examiner*—Bipin H. Shalwala
*Attorney, Agent, or Firm*—Oliff & Berridge, PLC

[57] ABSTRACT

An image recognition apparatus which is capable of mounting many function such as an image enhancement and image recognition processes into one chip, for thus processing an image processing algorithm of an image enhancement and recognition in real time by extracting a characteristic of an object, comparing the thusly extracted characteristic with a reference pattern, recognizing an image, thus enhancing an image by using a convolver which is a spatial region filter, and by selectively outputting a data which was obtaining by processing the recognized image data or the image data, providing an image signal receiving and inputting unit, and a memory in a host computer for storing the data which were obtained through an image enhancement and recognition process, whereby the image recognition apparatus according to the present invention does not need a memory having a large capacity. The apparatus includes a bus line connected to the host computer and image receiving unit, respectively, a bus interface unit connected to the host computer for interfacing a data externally inputted or outputted through the bus line, and a correlation unit for subtracting a previously defined template data from an image data from the bus interface unit and for outputting a minimum value when an image data from the bus interface unit is matched with a template data.

4 Claims, 7 Drawing Sheets

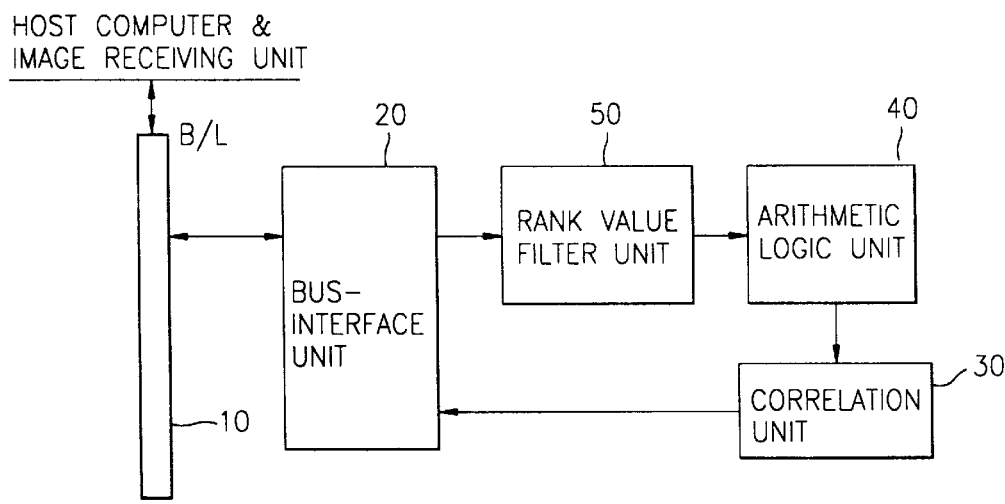
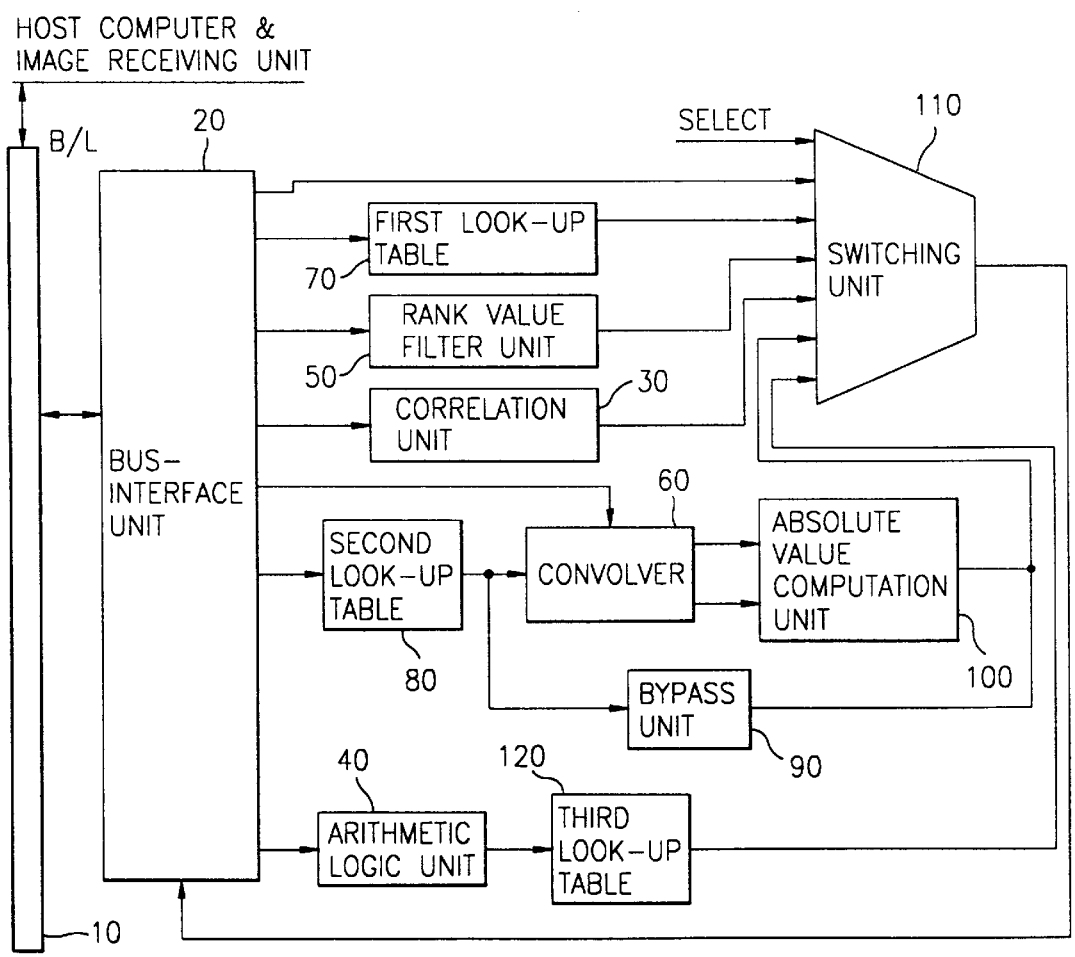

IMAGE RECOGNITION APPARATUS USING IMAGE ENHANCEMENT PROCESSING

BACKGROUND OF THE INVENTION

1. Field of the Invention

The present invention relates to an image recognition apparatus, and in particular to an improved image recognition apparatus which is capable of mounting a non-linear filter and convolution functions for an image enhancement and a template matching function for a pattern recognition into one chip, thus more effectively interfacing with a peripheral component interconnection (PCI) bus.

2. Description of the Conventional Art

Generally, when recognizing an object by using an image recognition apparatus, an edge portion extraction of an object, a comparison between the thusly extracted portion and a reference pattern, and an image correction and recovery are very important factors. In order to obtain the above-described factors, a numerous operation and high computation efficiency with respect to the obtained image data are needed.

Therefore, as methods for performing the above-described high speed operations, there are known a first method of processing the high speed operation by using an operational program and a high speed processor, and a second method of processing the same by using an image recognition circuit.

The first method has an advantage in that the circuit configuration may be made simpler, but the method needs an expensive high speed processor. In addition, the second method has an advantages in that it is possible to process data at high speed by using a cheap circuit, but has a complicated configuration.

The second method is disclosed in U.S. Pat. No. 4,829,380. The circuit of the same includes a rank value filter unit for dividing a screen into a plurality of pixel groups, separating the rank of the screen by the pixels in accordance with brightness and darkness of the image. With the construction, a multiplication, addition, or subtraction is performed with respect to the previous data and current data by the pixels, so that the average value between two operations is computed, and then the image is corrected, so that it is possible to enhance the image resolution through a point operation.

However, the conventional image recognition apparatus disclosed in U.S. Pat. No. 4,829,380 has problems in that the conventional image recognition apparatus does not have an improved image recognition technique such as a function of detecting an edge of a desired object, a function of detecting the size of the detected edge and direction of the same, and a function of judging the characteristic of an object by using an object data among images which were detected based on the template of a memorized object, and the size and direction of the same. Therefore, the conventional image recognition is not applicable to an apparatus for checking defects of a printed circuit board (PCB) and an apparatus for detecting a vehicle which violates a traffic rule and implementing the same.

In addition, U.S. Pat. No. 4,829,380 includes a camera, an analog/digital conversion unit for converting an analog image signal into a digital image signal, a unit for separating a synchronous signal, and an input unit for processing an input signal. Furthermore, U.S. Pat. No. 4,829,380 includes units for enhancing and recovering an image receiving signal disposed in the entire circuit, so that the conventional art disadvantageously needs a large capacity of memory for storing a large amount of image data which are generated and processed by each unit.

Moreover, since U.S. Pat. No. 4,829,380 discloses only a rank value filtering technique and a point operation technique, it is impossible to obtain a desired image resolution improvement.

SUMMARY OF THE INVENTION

Accordingly, it is an object of the present invention to provide an image recognition apparatus which overcomes the aforementioned problems encountered in the conventional art.

It is another object of the present invention to provide an improved image recognition apparatus which is capable of mounting a non-linear filter and convolution function for an image enhancement and a template matching function for a pattern recognition into one chip, thus more effectively interfacing with a peripheral component interconnection (PCI) bus.

It is another object of the present invention to provide an improved image recognition apparatus which is capable of mounting many function such as an image enhancement and image recognition processes into one chip, for thus processing an image processing algorithm of an image enhancement and recognition in real time by extracting a characteristic of an object, comparing the thusly extracted characteristic with a reference pattern, recognizing an image, thus enhancing an image by using a convolver which is a spatial region filter, and by selectively outputting a data which was obtaining by processing the recognized image data or the image data, providing an image signal receiving and inputting unit, and a memory in a host computer for storing the data which were obtained through an image enhancement and recognition process, whereby the image recognition apparatus according to the present invention does not need a memory having a large capacity.

To achieve the above objects, there is provided an image recognition apparatus which includes a bus line connected to the host computer and image receiving unit, respectively, a bus interface unit connected to the host computer for interfacing a data externally inputted or outputted through the bus line, and a correlation unit for subtracting a previously defined template data from an image data from the bus interface unit and for outputting a minimum value when an image data from the bus interface unit is matched with a template data.

To achieve the above objects, there is also provided an image recognition apparatus which includes a bus line connected to the host computer and image receiving unit, a bus interface unit connected to the bus line for interfacing a data inputted or outputted through the bus line, a first look-up table for converting an image data from the bus interface unit into a previously defined first table value, a rank value filter unit for providing a rank value to an image data from the bus interface unit in accordance with brightness and darkness and selecting and outputting an image data having an intermediate value, maximum value or minimum value of a rank, a correlation unit for subtracting a previously defined template data from an image data from the bus interface unit and outputting a minimum value when an image data from the bus interface unit is matched with a template data, a second look-up table for converting an image data from the bus interface unit into a previously defined second table value, a bypass unit for bypassing an output from the second look-up table, a convolver for performing a multiplication and addition with respect to a data from the second look-up table or an image data from the bus interface unit and previously defined two matrix values and outputting two resultant values, an absolute value computation unit for doubling and adding two resultant values from the convolver, computing the size with respect to an edge of an image, dividing two resultant values, obtaining an arc tangent value, and computing a directional value with respect to an edge of an image, an arithmetic logic unit for separating image data from the bus interface unit by the pixels, performing a multiplication, addition, or subtraction with respect to the previous pixel data and current input pixel data by the pixels, and outputting an image processed by th pixels, and a switching unit connected to outputs from the bus interface unit, the first look-up table, the rank value filter unit, the correlation unit, the bypass unit, the absolute value computation unit, and the arithmetic logic unit for selecting one signal among the signals therefrom in accordance with a selection signal from the host computer.

To achieve the above objects, there is also provided an image recognition apparatus which includes a bus line connected to the host computer and the image receiving unit, a bus interface unit connected to the bus line for interfacing a data inputted or outputted through the bus line, an arithmetic logic unit for separating an image data from the bus interface unit by the pixels, performing a multiplication, addition or subtraction with respect to the previous pixel data and the current input pixel data by the pixels, and outputting an image processed by the pixels, a rank value filter unit for providing a rank value to an image data form the arithmetic logic unit in accordance with brightness and darkness and selecting and outputting an image data having an intermediate value, a maximum value or a minimum value of a rank, and a convolver for performing a multiplication and addition with respect to an image data from the rank value filter unit and two matrix values and for outputting the values to the bus interface unit.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a block diagram illustrating an image recognition apparatus according to a seventh embodiment of the present invention;

FIG. 8 is a block diagram illustrating an image recognition apparatus according to an eighth embodiment of the present invention;

DETAILED DESCRIPTION OF THE INVENTION

Figure 1:
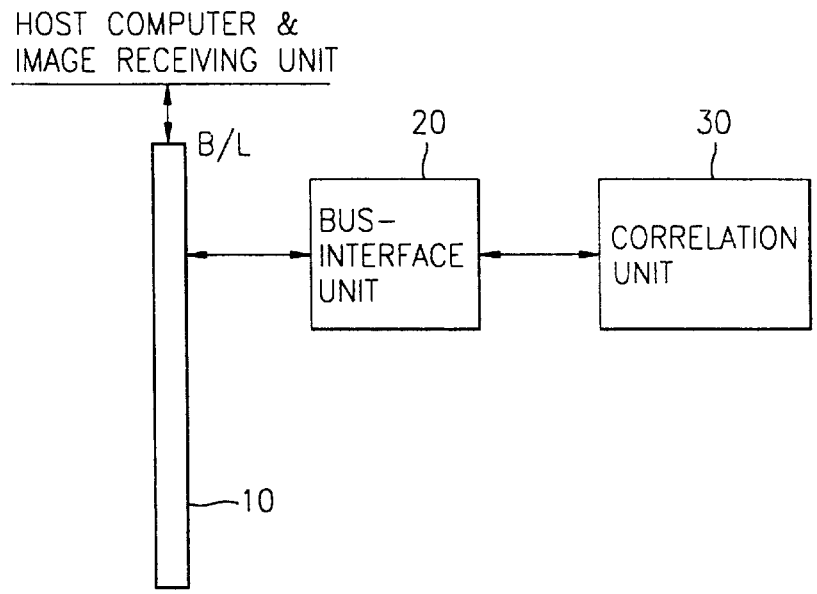
FIG. 1 is a block diagram illustrating an image recognition apparatus according to a first embodiment of the present invention.

FIG. 1 illustrates an image recognition apparatus according to a first embodiment of the present invention.

As shown therein, the image recognition apparatus according to a first embodiment of the present invention, in which an image processing system having a host computer and an image receiving unit is provided, includes a bus line 10 connected to the host computer and the image receiving unit, a bus interface unit 20 connected to the bus line 10 for interfacing the data inputted and outputted through the bus line 10, and a correlation unit 30 for subtracting the previously defined template data from the image data which is inputted trough the bus interface unit 20 and for outputting the minimum value to the interface unit 20 as a correlation value when the image data inputted through the bus interface unit 20 is matched with the template data.

Figure 2:
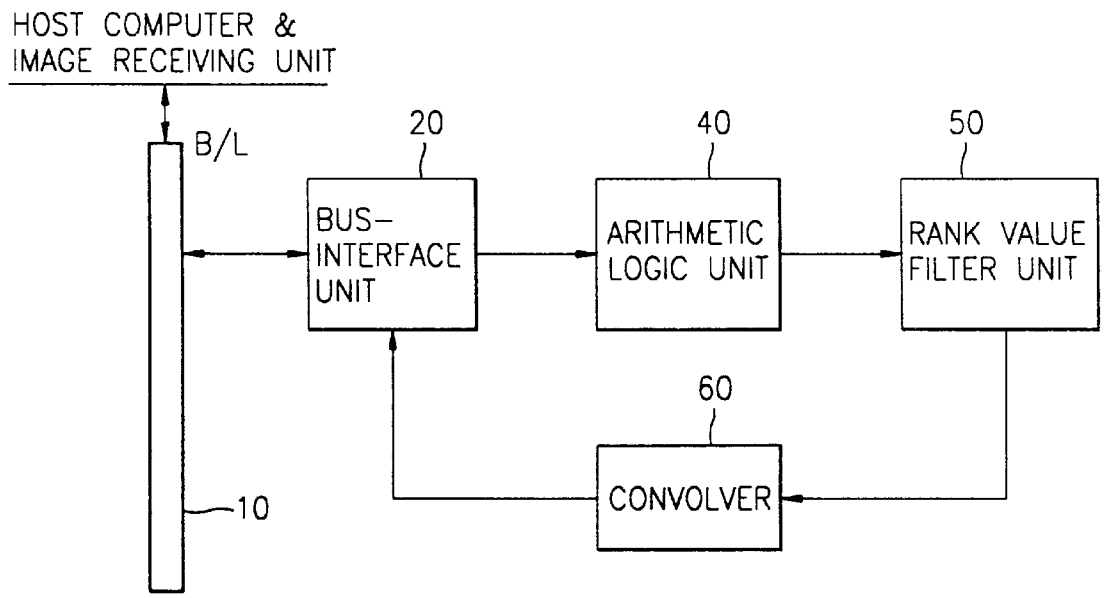
FIG. 2 is a block diagram illustrating an image recognition apparatus according to a second embodiment of the present invention.

FIG. 2 illustrates an image recognition apparatus according to a second embodiment of the present invention.

As shown therein, the image recognition apparatus according to a second embodiment of the present invention, in which an image processing system having a host computer and an image receiving unit is provided, includes a bus line 10 connected to the host computer and the image receiving apparatus, a bus interface unit 20 connected to the bus line 10 for interfacing the data inputted and outputted through the bus line 10, an arithmetic logic unit 40 for separating the image data inputted through the bus interface unit 20 by the pixels, performing a multiplication, addition, or subtraction, and outputting the image processed by the pixels, a rank value filter unit 50 for providing a rank value to the image data from the arithmetic logic unit 40 in accordance with brightness and darkness and for selectively outputting an image data having the intermediate value, the maximum value, or the minimum value of the rank, and a convolver 60 for multiplying the image data from the rank value filter unit 50 and two matrix values, adding the same, and outputting the resultant values of the multiplication and addition to the bus interface unit 20, respectively.

Figure 3:
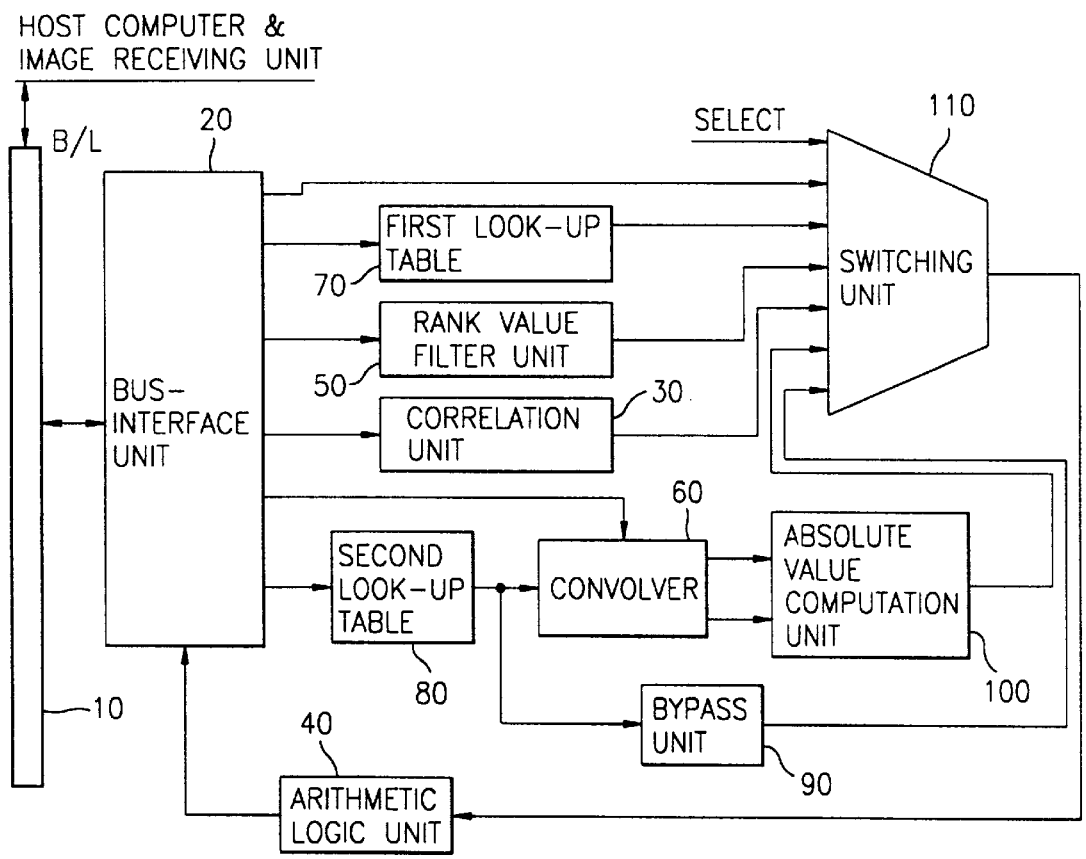
FIG. 3 is a block diagram illustrating an image recognition apparatus according to a third embodiment of the present invention.

FIG. 3 illustrates an image recognition apparatus according to a third embodiment of the present invention.

As shown therein, the image recognition apparatus according to a third embodiment of the present invention, in which an image processing system having a host computer and an image receiving unit is provided, includes a bus line 10 connected to the host computer and the image receiving unit, a bus interface unit 20 connected to the bus line 10 for interfacing the data inputted and outputted through the bus line 10, a first look-up table 70 for converting the image data inputted through the bus interface unit 20 into a previously defined first table value, a rank value filter unit 50 for providing the rank value to the image data inputted through the bus interface unit 20 in accordance with brightness and darkness and selectively outputting the image data having the intermediate value, the maximum data, and the minimum data of the rank, a correlation unit 30 for subtracting the previously defined template data from the image data inputted through the bus interface unit 20 and outputting the minimum value as a correlation values when the image data inputted through the bus interface unit 20 is matched with the template data, a second look-up table 80 for converting the image data inputted through the bus interface unit 20 into a previously defined second table value, a bypass unit 90 for bypassing the output from the second look-up table 80, a convolver 60 for performing a multiplication and an addition with respect to two matrix values of the image data from the second look-up table 90 or the bus interface unit 20, respectively, and for outputting two resultant values, an absolute value computation unit 100 for doubling two resultant values from the convolver 60, respectively, and then adding the same, for thus computing the size with respect the edge of the image, and computing the direction with respect to the edge of the image by using an arc tangent value by dividing two resultant values, an arithmetic logic unit 40 for grouping the image data inputted through the bus interface unit 20 by the pixels, performing a multiplication, addition or subtraction with respect to the previous pixel data and the current input pixel data by the pixels, and outputting the image data grouped by the pixels, and a switching unit 110 connected with the outputs from the interface unit 20, the first look-up table 70, the rank value filter unit 50, the correlation unit 30, the bypass unit 90, the absolute value computation unit 100, and the arithmetic logic unit 40, respectively, for selecting an output signal from the output signals therefrom in accordance with a selection signal from the host computer (not shown) and outputting the selected signal to the bus interface unit 20.

Figure 4:
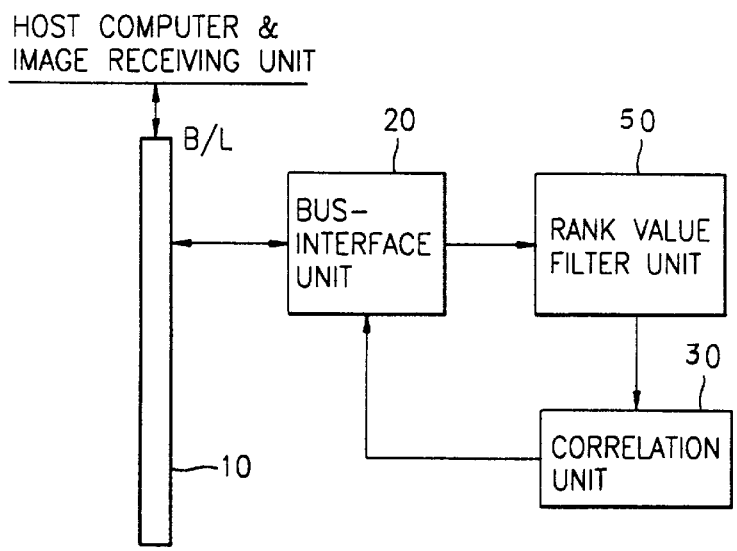
FIG. 4 is a block diagram illustrating an image recognition apparatus according to a fourth embodiment of the present invention.

FIG. 4 illustrates an image recognition apparatus according to a fourth embodiment of the present invention.

As shown therein, the image recognition apparatus according to a fourth embodiment of the present invention, in which an image processing system having a host computer and an image receiving unit is provided, includes a bus line 10 connected to the host computer and the image receiving unit, a bus interface unit 20 connected to the bus line 10 for interfacing the data inputted and outputted through the bus line 10, a rank value filter unit 50 for providing the rank value to the image data from the bus interface unit 20 in accordance with brightness and darkness and for selecting the image data having the intermediate value, the maximum data or the minimum value of the rank, and a correlation unit for subtracting the template data from the image data from the rank value filter unit 50 and outputting the minimum value to the bus interface unit 20 as a correlation value when the image data from the rank value filter unit 50 is matched with the template data.

Figure 5:
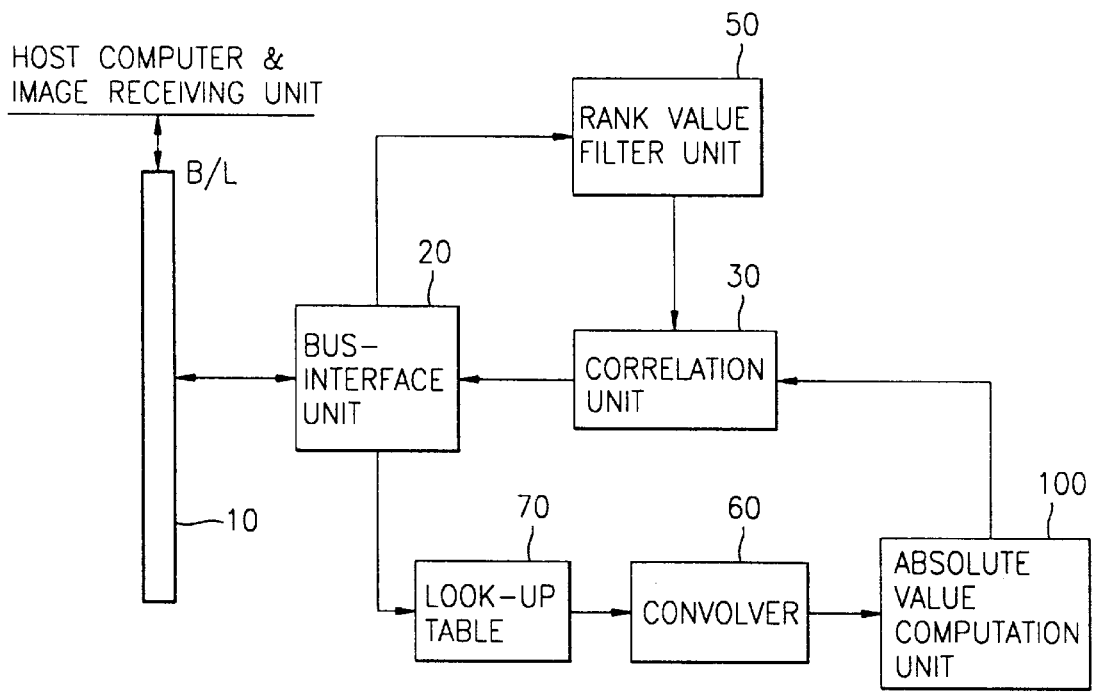
FIG. 5 is a block diagram illustrating an image recognition apparatus according to a fifth embodiment of the present invention.

FIG. 5 illustrates an image recognition apparatus according to a fifth embodiment of the present invention.

As shown therein, the image recognition apparatus according to a fifth embodiment of the present invention, in which an image processing system having a host computer and an image receiving unit is provided, includes a bus line 10 connected to the host computer and the image receiving unit, a bus interface unit 20 connected to the bus line 10 for interfacing the data inputted and outputted through the bus line 10, a rank value filter unit 50 for providing the rank value to the image data from the bus interface unit 20 in accordance with brightness and darkness and selecting the image data having the intermediate value, the maximum value, or the minimum value of the rank, a look-up table 70 for converting the image data inputted through the bus interface unit 20 into the previously defined table value, a convolver 60 for performing a multiplication and an addition with respect to the image data from the look-up table 70 and two matrix values and for two resultant values, an absolute value computation unit 100 for doubling two resultant values from the convolver 60, respectively, adding the same, computing the size with respect to the edge of the image, obtaining the arc tangent value by dividing two resultant values, and computing the direction with respect to the edge of the image, and a correlation unit 30 for subtracting the previously defined template data from the image data from the rank value filter unit 50 and outputting the minimum value to the bus interface unit 20 as a correlation value when the size of the image from the absolute value computation unit 100 is identical to the direction, and the image data from the rank value filter unit 50 is matched with the template data.

Figure 6:
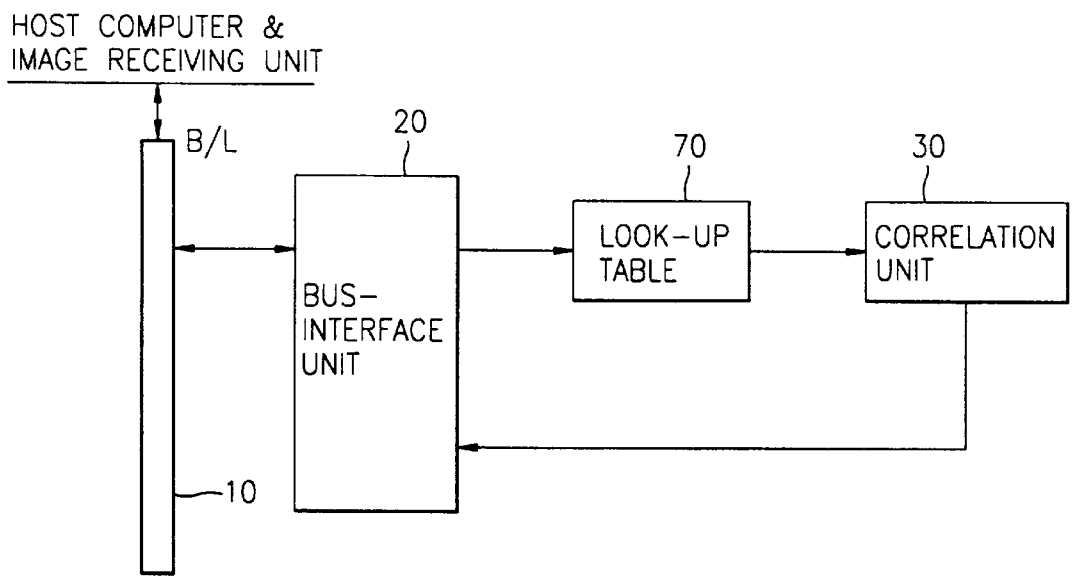
FIG. 6 is a block diagram illustrating an image recognition apparatus according to a sixth embodiment of the present invention.

FIG. 6 illustrates an image recognition apparatus according to a sixth embodiment of the present invention.

As shown therein, the image recognition apparatus according to a sixth embodiment of the present invention, in which an image processing system having a host computer and an image receiving unit is provided, includes a bus line 10 connected to the host computer and the image receiving unit, a bus interface unit 20 connected to the bus line 10 for interfacing the data inputted and outputted through the bus line 10, a look-up table 70 for converting the image data from the bus interface unit 20 into a previously defined value, and a correlation unit 30 for subtracting the previously defined template data from the image data from the look-up table 70 and outputting the minimum value to the bus interface unit 20 as a correlation value when the image data from the look-up table 70 is matched with the template data.

FIG. 7 illustrates an image recognition apparatus according to a seventh embodiment of the present invention.

As shown therein, the image recognition apparatus according to a seventh embodiment of the present invention, in which an image processing system having a host computer and an image receiving unit is provided, includes a bus line 10 connected to the host computer and the image receiving unit, a bus interface unit 20 for interfacing the data inputted and outputted through the bus line 10, a rank value filter unit 50 for providing the rank value to the image data from the bus interface unit 20 in accordance with brightness and darkness and selecting the image data having the intermediate value, the maximum value or the minimum value of the rank, an arithmetic logic unit 40 for grouping the image data from the rank value filter unit 50 by the pixels, performing a multiplication, addition or subtraction with respect to the previous data and the current input pixel data by the pixels, and outputting the image data grouped by the pixels, and a correlation unit 30 for subtracting the previously defined data from the image data from the arithmetic logic unit 40, and outputting the minimum value to the bus interface unit 20 as a correlation value when the image data from the arithmetic logic unit 40 is matched with the template data.

FIG. 8 illustrates an image recognition apparatus according to an eighth embodiment of the present invention.

As shown therein, the construction of the image recognition apparatus according to the eighth embodiment of the present invention is identical to the image recognition apparatus according to the third embodiment of the present invention except that the eighth embodiment further includes a third look-up table 120 for adjusting the data from the arithmetic logic unit 40 to a data having a predetermined number of bits which is defined by a user and then outputting the data to the switching unit 110.

Here, the switching unit 110 is connected with the interface unit 20, the first look-up table 70, the rank value filter unit 50, the correlation unit 30, the bypass unit 90, the absolute value computation unit 100, and the third look-up table 70, respectively, for selecting an output signal from the output signal therefrom in accordance with a selection signal from the host computer (not shown) and outputting the signal to the bus interface unit 20.

Figure 11:
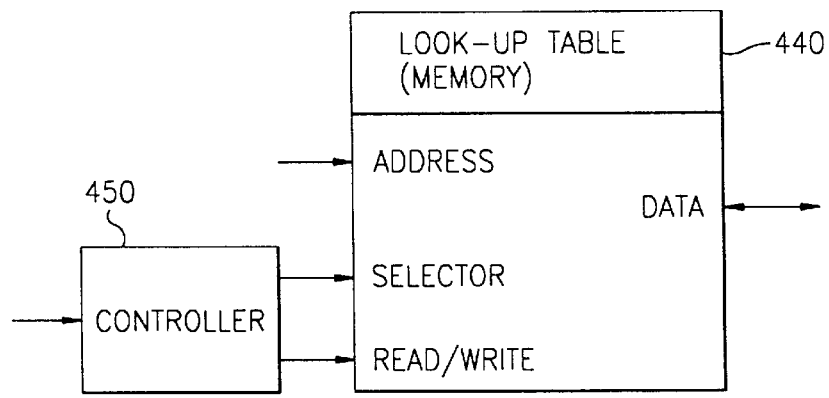
FIG. 11 is a diagram illustrating a look-up table in the circuit of FIG. 3.

As shown in FIG. 11, the first look-up table 70, the second look-up table 80, and the third look-up table 120 each include a memory 440 and a controller 450 for controlling the memory 440. The memory 440 stores a conversion data by using a write and select signals by the controller 450 and outputs a table value matching with the address as the read and select signals are enabled in accordance with the controller 450 when an address (namely, an image data) is applied.

The rank value filter unit 50 includes a plurality of rank value filters for separating the externally inputted image data into a rank value, and a plurality of multiplexors for obtaining the intermediate value, the maximum value, or the minimum value of the image by using the rank value separated by the rank value filter.

Figure 13:
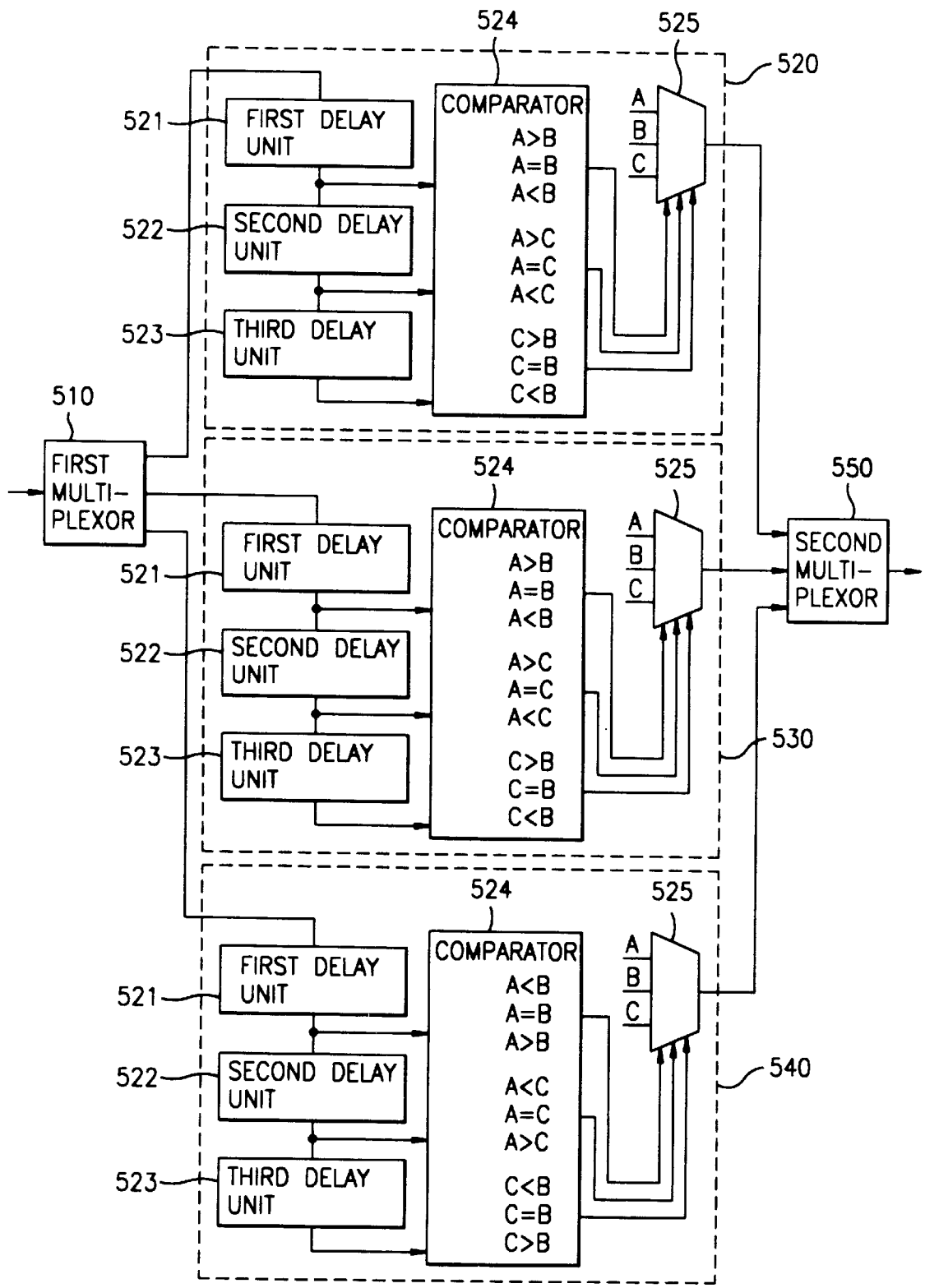
FIG. 13 is a detailed block diagram illustrating rank value filter unit in the circuit of FIG. 2.

FIG. 13 illustrates a rank value filter unit which includes a first multiplexor 510 for multiplexing the image data from the bus line 10 and separating the data into three data, first, second, and third delay/comparators 520, 530, and 540 for sequentially delaying the data from the first multiplexor 10, comparing the thusly delayed data, and outputting rank values, and a second multiplexor 550 for selecting one from three data in accordance with the rank values from the first, second, and three delay/comparators 520, 530, and 540.

The first, second, and third delay/comparators 520, 530, and 540 each include first, second and third delay units 521, 522, and 523 for sequentially delaying the data from the first multiplexor 510, a comparator 524 for comparing the size of the data from the first, second and third delay units 521, 522, and 523, and a multiplexor 525 for selecting one from the data inputted in accordance with the rank value which is obtained through a comparison by the comparator 524.

Figure 12:
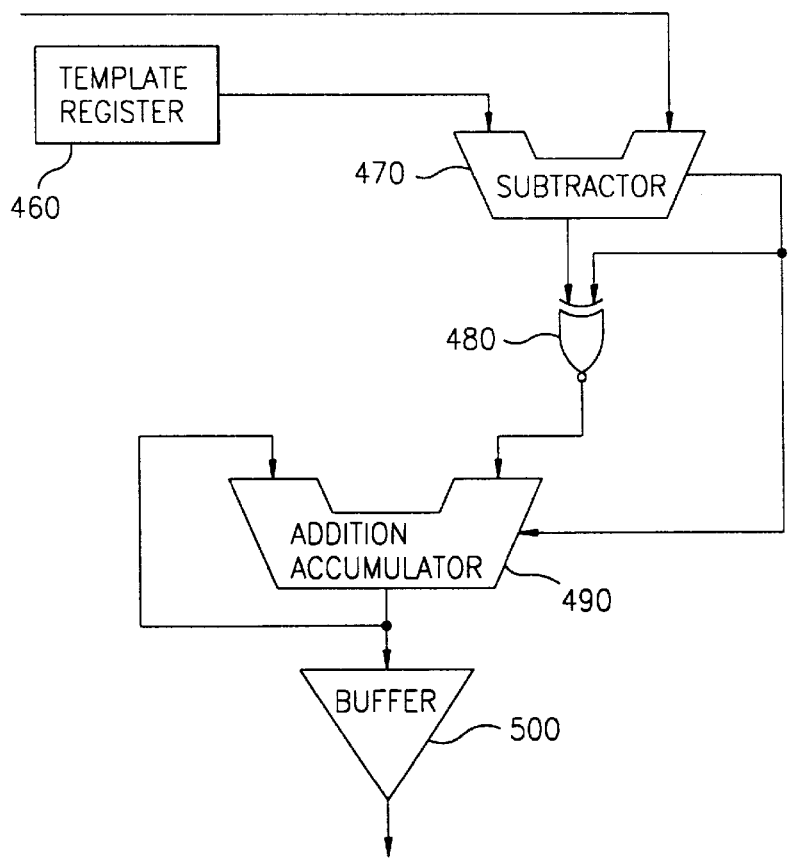
FIG. 12 is a detailed block diagram illustrating a normalization correlation unit in the circuit of FIG. 1.

As shown in FIG. 12, the correlation unit 30 includes a template register 460 for storing the template stored by a user, a subtractor 470 for outputting the resultant data which is obtained by receiving the image data from the bus line 10 and the template from the template register 460 and a carry signal having a negative or positive information by the digits of the resultant data, an exclusive NOR-gate 480 for exclusively NORing the output and carry from the subtractor 470, an addition accumulator 490 for adding and accumulating the output from the exclusive NOR-gate 480 and the output from itself, and an output buffer 500 for buffering the output from the addition accumulator 490 and outputting the final correlation value to the outside.

Figure 9:
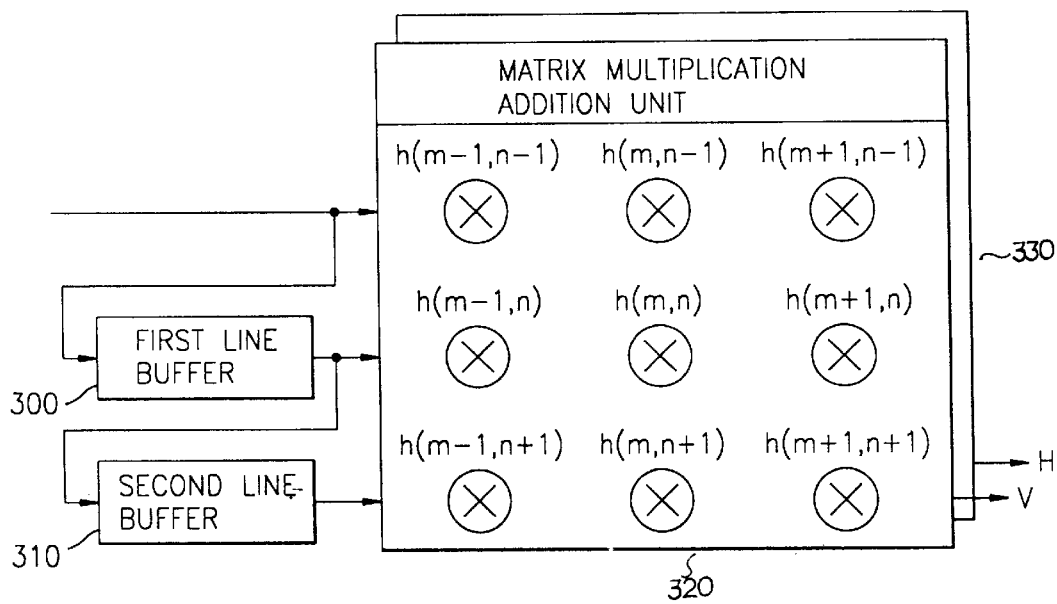
FIG. 9 is a detailed diagram illustrating a convolver in the circuit of FIG. 2.

As shown in FIG. 9, the convolver 60 includes a first line buffer 300 for delaying the externally inputted data or the image data by one line, a second line buffer 310 for delaying the output from the first line buffer 300 by one line, and two matrix multiplication adders 320 and 330 for converting the externally inputted data or the image data and the outputs from the first and second line buffers 300 and 310 into 2-dimensional data of horizontal and vertical neighboring pixel regions, and outputting the data to bus interface unit 20, or the absolute value computation unit 100, or the bus interface unit 20.

Figure 10:
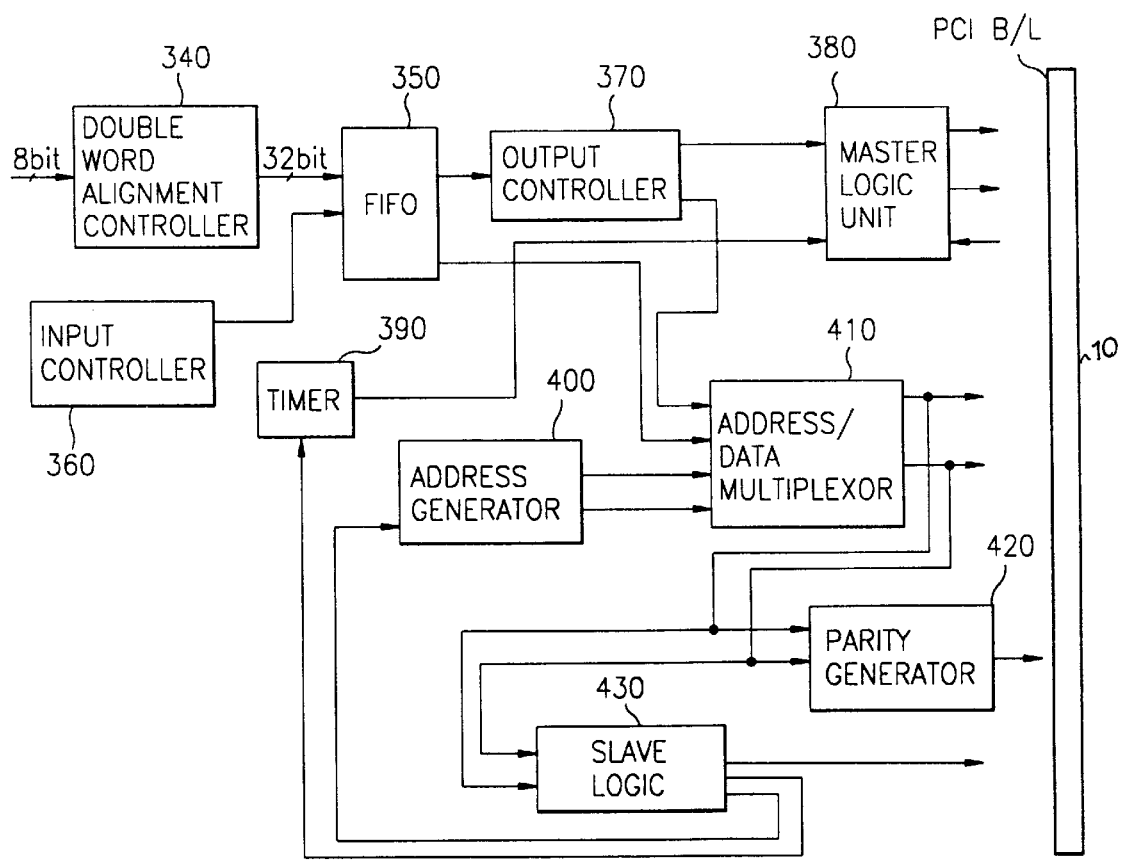
FIG. 10 is a detailed block diagram illustrating a bus interface unit in the circuit of FIG. 1.

As shown in FIG. 10, the bus interface unit 20 includes a double word alignment unit 340 for aligning the externally inputted 8-bit data for transmitting the data by 32 bits, a FIFO unit 350 for sequentially storing the output data from the double word alignment unit 340 and sequentially outputting the output data from the double word alignment unit 340, an input controller 360 for controlling the data input from the FIFO unit 350, an output controller 370 for controlling the data output from the FIFO unit 350 in accordance with a control of the input controller 360, a master logic unit 380 for transmitting the output data from the output controller 370 to the bus line in accordance with a predetermined sequence of the transmission of a request signal to the bus line, the waiting state of the grant signal, etc., a timer 390 for counting time in order to judge a response timing of the master logic unit 380, an address generator 400 for generating an address in order to directly transmit the data to the memory, not through a central processing unit (CPU), an address/data multiplexor 410 for multiplexing the address from the address generator 400 and the output data from the output controller 370 and transmitting the data to the bus line, a parity generator 420 for detecting the output data from the address/data multiplexor 410 and transmitting the generated parity to the bus line, and a slave logic unit 430 for controlling the timer 390 and the address generator 400 by using the address/data from the address/data multiplexor 410 as an input.

The operation and effects of the image recognition apparatus according to the first embodiment of the present invention will now be explained with reference to FIG. 1.

When the host computer (not shown) transmits a control command to the bus interface unit 20, the image data from the camera (not shown) is inputted into the bus interface 20 through the bus line 10.

The operation of the bus interface unit 20 will now be explained in more detail with reference to FIG. 10.

Here, the bus line 10 uses a PCI bus, and the bus interface unit 20 also uses the PCI bus interface because the PCI bus is a data bus which is capable of transmitting the data at about 132 Mbye/sec. Therefore, the PCI bus is well applicable to a high speed image processing.

In order to transmit the 8-bit data by 32 bits at one time, when the double word alignment unit 340 aligns the image data inputted through the bus line in a double word form, the FIFO unit 350 sequentially stores the data in accordance with a control of the input controller 360, and sequentially outputs the data in accordance with a control of the output controller 370.

In addition, the master logic unit 380 transmits a request signal to the host computer through the bus line, and the image data from the FIFO unit 350 in accordance with a control of the output controller 370.

At this time, the timer 390 counts time in accordance with a control of the slave logic unit 430, and outputs a response timing to the master logic unit 380.

The address/data multiplexor 410 receives an output data from the FIFO unit 350 and the address from the address generator 400 in accordance with a control of the output controller 370, multiplexes the same, and transmits the same to the bus line. At this time, the parity generator 420 receives the output from the address/data multiplexor 410, generates the parity data and transmits the data to the bus line 10.

The address generator 400 generates an address in accordance with a control of the slave logic unit 430 so that the data is directly transmitted to the memory, not through the host computer, for thus maximizing the efficiency and performance of the system. In addition, the slave logic unit 430 receives a control signal and data from the host computer through the bus line 10.

Thereafter, the c orrelation unit 30 compares the image data inputted through the bus interface unit 20 with the template previously stored in the template register 460, and performs the operations of the subtractor 470, the exclusive NOR-gate 480, and the addition accumulator 490, for thus obtaining a correlation value as follows.

$$S[i, j] = \sum_{m=0, r=0}^{k-1} |X[i + m, j + r] - A[m, r]|$$

where, the template size is "k×k", the array "X(m×m)" is a search image data, the array A(r×r) is r<m based on the template data array structure, and i,j denote a search region. Actually, the difference of the absolute value is computed for an operation efficiency. Namely, a region in which the value S|i,j| is minimum is known as a region in which the matching score is lowest, and the correlation is highest by shifting the data as much as the area of (i,j).

In addition, the correlation value from the correlation unit 30 is inputted into the host computer through the bus interface unit 20, and the host computer judges the image recognized by the image recognition apparatus by using the correlation value, and the image processing system controls the next operation of the system so that the recognized image data can be processed.

Therefore, a portion of the thusly recognized image is rapidly extracted, so that it is possible to more rapidly recognize the image.

The operation and effect of the image recognition apparatus according to the second embodiment of the present invention will now be explained with reference to FIG. 2.

When the host computer (not shown) transmits a control command to the bus interface unit 20, the image data received from a camera (not shown) is inputted into the arithmetic logic unit 40 through the bus line 10 and the bus interface unit 20.

The arithmetic logic unit 40 groups the image data from the bus interface unit 20 by the pixels, performs a multiplication, addition, or subtraction with respect to the previous pixel data and currently inputted pixel data by the pixels, and outputs the processed image data by the pixels. The operation which is performed by the arithmetic logic unit 40 is called as a point operation.

In addition, the rank value filter unit 50, which receives the image data from the arithmetic logic unit 40, provides a rank value to the image data from the arithmetic logic unit 40 in accordance with brightness and darkness, selects and outputs the image data having the intermediate value, maximum value, or minimum value of the rank.

The detailed operation of the rank value filter unit 50 will now be explained with reference to FIG. 13.

When the image data from the arithmetic unit 40 is applied to the first multiplexor 510 and is inputted into the first, second, third delay units 521, 522, and 523 of the first comparator 520, respectively, the comparator 524 compares the sizes of the output values from the first through third delay units 521 through 523, and outputs the ranks of the compared sizes. The multiplexor 525 selects one among the maximum value, minimum value, and intermediate value of the input data. In addition, the second and third comparators 530 and 540 perform the same operation as the comparator 524. Therefore, one among the maximum, minimum, and intermediate values is sequentially selected as a rank value, and then the values are arranged in the sequence of size, and the final output from the second multiplexor 550 is selected.

The convolver 60 performs a multiplication and addition with respect to the data from the rank value filter unit 50 and two matrix values, and outputs two resultant values, namely, the horizontal and vertical direction vector values with respect to the edge, to the bus interface unit 20.

Thus, first line buffer 300 of the convolver 60 delays the output signal from the rank value filter 50 by one line, and the second line buffer 310 delays the output signal from the first line buffer 300 by one line, and then outputs the outputs therefrom to the matrix multiplication and addition units 320 and 330, respectively. The matrix multiplication and addition units 320 and 330 convert the output from the second line buffer 310 into 2-dimensional spatial data of the neighboring pixel region, and performs a multiplication and addition operation with respect thereto, whereby the operation result is outputted to the bus interface unit 20.

The matrix multiplication and addition units 320 and 330 is known as a circuit which is configured based on the multiplication and addition of interior values A through I and delay input data h(m−1, n−1) through h(m+1, n+1) and has horizontal output values of "Axh(m−1, n−1)+Bxh(m, n−1)+Cxh(m+1, n−1)+Dxh(m−1, n), Exh(m, n)+Fxh(m+1, n)+Gxh(m−1, n+1)+Hxh(m, n+1)+Ixh(m+1, n+1)" and vertical output values of "Axh(m−1, n−1)+Dxh(n, n−1)+Gxh(m+1, n−1)+Bxh(m−1, n), Exh(m, n)+Hxh(m+1, n)+Cxh(m−1, n+1)+Fxh(m, n+1)+Ixh(m+1, n+1)". The noise contained in the image output is filtered by a band width filter or a low pass filter in accordance with the values of the matrix multiplication and addition units 320 and 330, for thus enhancing the image quality. Here, the interior values A through I are filter kernel values, and the sequentially inputted image data h(m−1, n−1) . . . are expressed as positional values of each pixel with respect to the filter kernel. The matrix multiplication and addition units 320 and 330 are formed of a 3×3 filter kernel, a 4×4 filter kernel, or a 5×5 filter kernel which is defined by a user.

Therefore, the image recognition apparatus according to the second embodiment of the present invention is capable of enhancing the quality of image through the above-described construction and operation.

The image recognition apparatus according to the third embodiment of the present invention will now be explained with reference to FIG. 3.

When the host computer (not shown) transmits a control command to the bus interface unit 20, the image data received from a camera (not shown) is inputted into the switching unit 110 through the bus line 10 and the bus interface unit 20, or is inputted into the first look-up table 70, the rank value filter unit 50, the correlation unit 30, the second look-up table 80, the convolver 60, and the arithmetic logic unit 40, respectively.

The first look-up table 70 converts the image data from the bus interface unit 20 into a previously defined first table value and outputs the data to the switching unit 110.

Namely, the first look-up table 70 determines the threshold value of the image data inputted through the bus line 10 in accordance with a table value which was defined by a user and converts the data into a mapping data based on the data correction and binarization and then inputs the data into the switching unit 110.

In other words, the binarization value of the image data inputted through the bus line 10 becomes an input value of the first look-up table 70 as an address, and the data value (table value) of the memory designated in accordance with the address becomes an output of the first look-up table 70.

The rank value filter unit 50 provides the rank value to the image data from the bus interface unit 20 in accordance with brightness and darkness, selects an image data having the intermediate value, the maximum value, or the minimum value of the rank, and outputs the value to the switching unit 110. Since the operation thereof is the same as the rank value filter unit 50 according to the second embodiment of the present invention, the description thereof will be omitted for simplification.

The correlation unit 30 subtracts the previously defined template data from the image data from the bus interface unit 20, and outputs the minimum value to the switching unit 110 when the image data inputted through the bus interface unit 20 is matched with the template data. Since the operation thereof is the same as the correlation unit 30 according to the first embodiment of the present invention, the description thereof will be omitted for simplification.

The second look-up table 80 converts the image data inputted through the bus interface unit 20 into a previously defined second table value and outputs the value to the bypass unit 90 and the convolver 60, respectively. Since the operation thereof is the same as the first look-up table 70, the description thereof will be omitted for simplification.

The bypass unit 90 bypasses the output from the second look-up table 80 and outputs the output to the switching unit 110.

The convolver 60 performs a multiplication and addition with respect to the data from the second look-up table 80 or the image data from the bus and two matrix values and outputs two resultant values, namely, the horizontal and vertical direction vector values with respect to the edge, to the absolute value computation unit 100.

In addition, the absolute value computation unit 100 doubles and adds two resultant values from the convolver 60 and computes the size with respect to the edge of the image, and then divides two resultant values, for thus obtaining an arc tangent value, and computes the direction with respect to the edge of the image. Namely, the edge of the image is detected, and is inputted into the switching unit 110.

Here, the edge of the image has the size S and direction D thereof. The horizontal and vertical result values which were obtained by the convolver 60 are used.

The size S and direction D of the edge may be expressed as follows.

$$S = \sqrt{V^2 + H^2}, D = \tan^{-1}\left(\frac{V}{H}\right)$$

where, H denotes the output with respect to the horizontal direction of the edge computed by and outputted from the convolver 60, and V denotes the output with respect to the vertical direction of the edge computed by and outputted from the convolver 60. Therefore, the absolute value computation unit 100 is directed to computing the vector value with respect to the edge.

The arithmetic logic unit 40 performs a point operation with respect to the image data inputted through the bus interface unit 20, and outputs the image data processed by the pixels to the switching unit 110.

The switching unit 110 is connected with the outputs from the bus interface unit 20, the first look-up table 70, the rank value filter unit 0, the correlation unit 30, the bypass unit 90, the absolute value computation unit 100, and the arithmetic logic unit 40, respectively and selects one output from the outputs therefrom in accordance with a selection signal from the host computer and then outputs the selected output to the bus interface unit 20. Since the remaining operation thereof is the same as the switching unit according to the first embodiment of the present invention, the description thereof will now be omitted for simplification.

Therefore, in the third embodiment of the present invention, it is possible to select the quality-enhanced output data and the recognized image data and to enhance the quality of the image.

In addition, the functions of the first look-up table 70, the rank value filter unit 50, the correlation unit 30, and the convolver 60 are selectively used in accordance with an adjustment by a user, namely, in accordance with a selection signal from the host computer.

The operation and effects of the image recognition apparatus according to the fourth embodiment of the present invention will now be explained with reference to FIG. 4.

When the host computer (not shown) transmits a control command to the bus interface unit 20, the image data received from the camera (not shown) is inputted into the rank value filter unit 50 through the bus line 10 and the bus interface unit 20.

Thereafter, the rank value filter unit 50 provides the rank value to the image data inputted through the bus interface unit 20 in accordance with brightness and darkness and selects an image data having the intermediate value, the maximum value or the minimum value of the rank and then outputs the data to the correlation unit 30. Since the remaining operation thereof is the same as the rank value filter unit 50 according to the second embodiment of the present invention, the description thereof will be omitted for simplification. In addition, since the operation of the correlation unit 30 is the same as the first embodiment of the present invention, the detailed description of the same will be omitted for simplification.

Therefore, it is possible to more rapidly extract a portion of the image, so that it is possible to more rapidly recognize the image.

The operation and effects of the image recognition apparatus according to the present invention according to the fifth embodiment of the present invention will now be explained with reference to FIG. 5.

When the host computer (not shown) transmits a control command to the bus interface unit 20, the image data received from the camera (not shown) is inputted into the rank value filter unit 50 and the look-up table 70 through the bus line 10 and the bus interface unit 20.

Thereafter, the rank value filter nit 50 provides the rank value to the image data inputted through the bus interface unit 20 in accordance with brightness and darkness and selects an image data having the intermediate value, the maximum value or the minimum value of the rank and then outputs the value to the correlation unit 30. Since the remaining operation thereof is the same as the rank value filter unit 50, the description thereof will be omitted for simplification.

In addition, the look-up table 70 converts the image data inputted through the bus interface unit 20 into a previously defined table value, and outputs the value to the convolver 60.

The convolver 60 performs a multiplication, and addition with respect to the image data from the look-up table 70 and two matrix values, and outputs two resultant values to the absolute value computation unit 100. The absolute computation unit 100 doubles and adds two resultant values from the convolver 60, for thus computing the size with respect to the edge of the image, and two resultant values are divided for obtaining an arc tangent value, and the direction with respect to the edge of the image is computed, and is outputted to the correlation unit 30.

Identically to the operation of the correlation unit 30 according to the first embodiment of the present invention, the correlation unit 30 subtracts a previously defined template data from the image data from the rank value filter unit 160 and outputs the minimum value as a correlation value when the image data, the size and direction of which are matched with the image from the absolute value computation unit, is matched with the template data. The correlation value is outputted to the host computer through the bus interface unit 20. Since the remaining operation thereof is the same as the first embodiment of the present invention, the description thereof will be omitted for simplification.

Therefore, it is possible more rapidly extract a portion of the image, for thereby more rapidly recognizing the image received.

The operation and effects of the image recognition apparatus according to the sixth embodiment of the present invention will now be explained with reference to FIG. 6.

When the host computer (not shown) transmits a control command to the bus interface unit 20, the image data received from the camera (not shown) is inputted into the look-up table 70 through the bus line 10 and the bus interface unit 20.

The look-up table 70 converts the image data inputted through the bus interface unit 20 into a previously defined table value, and outputs the value to the correlation unit 30.

Thereafter, the correlation unit 30 performs the same operation as the correlation unit according to the first embodiment of the present invention by using the data from the look-up table 70 and computes the correlation value. The correlation values are inputted into the host computer through the bus interface unit 20. Since the remaining operation thereof is the same as the first embodiment of the present invention, the description thereof will now be omitted for simplification.

Therefore, it is possible to more rapidly extract a portion of the image received, for thus more rapidly recognizing the image received.

The operation and effects of the image recognition apparatus according to the seventh embodiment of the present invention will now be explained with reference to FIG. 7.

When the host computer (not shown) transmits a control command to the bus interface unit 20, the image data received from the camera (not shown) is inputted into the rank value filter unit 50 through the bus line 10 and the bus interface unit 20.

The rank value filter unit 50 provides the rank value to the image data inputted through the bus interface unit 20 in accordance with brightness and darkness, selects an image data having the intermediate value, the maximum value, or the minimum value of the rank, and outputs the data to the arithmetic logic unit 40.

Thereafter, the arithmetic logic unit 40 performs a point operation with respect to the image data inputted through the bus interface unit 20, and outputs the image data processed by the pixels to the correlation unit 30. Since the remaining operation thereof is the same as the first embodiment of the present invention, the description thereof will be omitted for simplification.

Therefore, it is possible to more rapidly extract a portion of the image received, for thus more rapidly recognizing the image received.

The operation and effects of the image recognition apparatus according to the eighth embodiment of the present invention will now be explained with reference to FIG. 8.

First, when the host computer (not shown) transmits a control command to the bus interface unit 20, the image data received from the camera (not shown) is inputted into the first look-up table 70, the rank value filter unit 50, the correlation unit 30, the second look-up table 80, the convolver 60, and the arithmetic logic unit 40, respectively, through the bus line 10 and the bus interface unit 20.

In addition, the operations of the first look-up table 70, the rank value filter unit 50, the correlation unit 30, the second look-up table 80, and the convolver 60 are the same as the third embodiment of the present invention. The arithmetic logic unit 40 performs a point operation by using the data from the bus interface unit 20, so that the image data processed by the pixels are outputted to the third look-up table 120.

The third look-up table 120 adjusts the data from the arithmetic logic unit 40 to the data of a predetermined number of bits which is defined by a user. Since the remaining operation is the same as the third embodiment of the present invention, the description thereof will be omitted for simplification.

Therefore, it is possible to selectively output an image-improved output data and recognized data having various recovery characteristics to the host computer in accordance with a selection signal from the switching unit 110, for thus recognizing high resolution image.

As described above, the image recognition apparatus according to the present invention is directed to mounting template matching functions into one chip for an enhancement of image, data recovery, edge detection, and object recognition. Therefore, the processes for enhancing the image for an optimum object recognition are concurrently performed. Furthermore, it is possible to simplify the construction of the apparatus and to transmit data at high speed by using the PCI bus without additional memory.

Although the preferred embodiments of the present invention have been disclosed for illustrative purposes, those skilled in the art will appreciate that various modifications, additions and substitutions are possible, without departing from the scope and spirit of the invention as recited in the accompanying claims.

What is claimed is:

1. An image recognition apparatus using image enhancement processing wherein a host computer and an image receiving unit are separately provided, comprising:

a bus line connected to the host computer and image receiving unit;

a bus interface unit connected to the bus line for interfacing a data inputted or outputted through the bus line;

a first look-up table for converting an image data from the bus interface unit into a previously defined first table value;

a rank value filter unit for providing a rank value to an image data from the bus interface unit in accordance with brightness and darkness and selecting and out putting an image data having an intermediate value, maximum value or minimum value of a rank;

a correlation unit for subtracting a previously defined template data from an image data from the bus interface unit and outputting a minimum value when an image data from the bus interface unit is matched with a template data;

a second look-up table for converting an image data from the bus interface unit into a previously defined second table value;

a bypass unit for bypassing an output from the second look-up table;

a convolver for performing a multiplication and addition with respect to a data from the second look-up table or an image data from the bus interface unit and previously defined two matrix values and for outputting two resultant values through the multiplication and addition, said two resultant values being a horizontal and vertical direction values with respect to an edge of the image;

an absolute value computation unit for doubling and adding two resultant values from the convolver, computing the size with respect to an edge of an image, dividing two resultant values, obtaining an arc tangent value, and computing a directional value with respect to an edge of an image;

an arithmetic logic unit for separating image data from the bus interface unit by the pixels, performing a multiplication, addition, or subtraction with respect to the previous pixel data and current input pixel data by the pixels, and outputting an image processed by the pixels; and a switching unit connected to outputs from the bus interface unit, the first look-up table, the rank value filter unit, the correlation unit, the bypass unit, the absolute value computation unit, and the arithmetic logic unit for selecting one signal among the signals therefrom in accordance with a selection signal from the host computer.

2. The apparatus of claim 1, further comprising a third look-up table for adjusting a data from the arithmetic logic unit to a data having a predetermined number of bits which is defined by a user and outputting the data to the switching unit, wherein said switching unit is connected to the outputs from the bus interface unit, the first look-up table, the rank value filter unit, the correlation unit, the bypass unit, the absolute value computation unit, and the third look-up table for selecting one signal among the signals therefrom in accordance with a selection signal from the host computer and outputs the selected signal to the bus interface unit.

3. The apparatus of claim 2, wherein the bus interface unit, the first look-up table, the rank value filter unit, the correlation unit, the second look-up table, the bypass unit, the convolver, the absolute value computation unit, the arithmetic logic unit, and the third look-up table are mounted into one chip.

4. The apparatus of claim 2, wherein said first, second and third look-up tables each include a memory and a controller for controlling the memory, wherein said memory previously stores a conversion data by using write and select signals in accordance with a control of the controller and outputs a data as read and select signals are enabled in accordance with a control of the controller when an address signal is applied.

* * * * *